(12) United States Patent
Phillips

(10) Patent No.: US 6,949,310 B2
(45) Date of Patent: Sep. 27, 2005

(54) LEAK PROOF PRESSURE RELIEF VALVE FOR SECONDARY BATTERIES

(75) Inventor: Jeffrey Phillips, Santa Clara, CA (US)

(73) Assignee: PowerGenix Systems, Inc., San Diego, CA (US)

( * ) Notice: Subject to any disclaimer, the term of this patent is extended or adjusted under 35 U.S.C. 154(b) by 410 days.

(21) Appl. No.: 10/098,193

(22) Filed: Mar. 15, 2002

(65) Prior Publication Data

US 2003/0175582 A1 Sep. 18, 2003
US 2004/0241535 A9 Sep. 18, 2003

Related U.S. Application Data

(60) Provisional application No. 60/276,364, filed on Mar. 15, 2001.

(51) Int. Cl.[7] ............................................. H01M 2/12
(52) U.S. Cl. .......................... 429/53; 429/54; 429/82; 429/86
(58) Field of Search ........................... 429/53, 54, 56, 429/82, 86, 89

(56) References Cited

U.S. PATENT DOCUMENTS 4,383,011 A * 5/1983 McClelland et al. .......... 429/54
5,506,067 A * 4/1996 Tinker ........................... 429/27

* cited by examiner

Primary Examiner—Jonathan Crepeau
(74) Attorney, Agent, or Firm—Beyer, Weaver & Thomas, LLP.

(57) ABSTRACT

Secondary batteries are subjected to power cycling, and those which have a liquid electrolyte within the interior volume are equipped with a pressure relief valve. A void space over the liquid electrolyte may be subjected to gas pressure variations with respect to the ambient. The pressure relief valve structure comprises a vertically oriented gas flow chamber, and an outer relief vent adapted to open only when gas pressure within the battery and the gas flow chamber exceeds a predetermined pressure with respect to the ambient pressure. The gas flow chamber extends below the top surface of the battery, and has a dome-like cap which extends downwardly and has a plurality of openings so as to permit unimpeded gas flow between the interior of the battery and the gas flow chamber. There is a porous membrane covering the dome which permits gas flow between the interior of the battery and the gas flow chamber, but precludes flow of liquid electrolyte from the interior volume of the battery to the gas flow chamber.

7 Claims, 1 Drawing Sheet

LEAK PROOF PRESSURE RELIEF VALVE FOR SECONDARY BATTERIES

This application claims the benefit of Provisional Application No. 60/276,364, filed Mar. 15, 2001.

FIELD OF THE INVENTION

This invention relates to secondary batteries, and particularly to a leak proof pressure relief valve for use in secondary batteries.

BACKGROUND OF THE INVENTION

Secondary batteries may be subjected to a variety of different circumstances surrounding their charge and discharge. Quite often a secondary battery may be subjected to rapid charge, and depending on the nature of the charging equipment and its control circuits, a battery may be subjected to overcharge conditions.

Likewise, a secondary battery may be subjected to discharge conditions that range from very gentle to abusive—for example, if the secondary battery is driving an electric motor that stalls.

Under any or all of those conditions, the chemistry of the battery—whether it be a lead acid battery, for example, or an alkaline battery—may be such that the interior volume of the battery may be subjected to varying gas pressure circumstances—both above and below (positive and negative) the ambient pressure within which the battery is operating. Of course, this discussion is directed to such batteries as lead acid batteries, but it is more particularly directed to alkaline batteries, all of which batteries in any event have a reserve of liquid electrolyte within the battery case structure.

Such a battery might be a high performance nickel zinc battery, for example, or even a nickel zinc supercapacator. In any event, any such battery in respect of which the present invention is particularly intended to be used, is typically considered to be a no maintenance battery—one that, apart from charging and the like, may never be checked or may only be checked very seldomly to determine the condition of the battery, the liquid electrolyte in the battery, and so on.

Because such batteries are subjected to variations of internal pressure, particularly pressure build up where the internal gas pressure of the battery rises well above the ambient pressure, such cells and batteries must be provided with means to relieve that internal pressure. Typically, that means the provision of a pressure relief valve, which has a number of functions to perform. They include:

Relief of internal excess gas pressure within the battery;

Prevention of atmospheric oxygen from entering the battery;

Having an operating life of at least equal to that of the battery, so that the pressure relief valve will operate successfully over the life of the battery.

The battery industry has employed a number of designs over the years. Typically, lead acid batteries are provided with a so-called Bunsen Valve, the structure of which is well known to those in the battery art. Such a valve is effectively a check valve, operating in one direction, and having a certain stiffness so as to open only after a gas pressure build up has reached a predetermined pressure.

Alkaline cells, particularly large alkaline cells in batteries of the sort that may be used, for example, in stand by operations and the like, have typically employed a spring loaded relief valve.

However, typically spring loaded relief valves operate at a higher pressure then Bunsen Valves, so that typically they may be activated only when the cell or battery is operating under abusive conditions. A Bunsen Valve will typically operate more frequently, under lower pressure conditions.

However, especially in the conditions or circumstances where a battery is operated in an inverted position—accidentally or deliberately—Bunsen Valves in particular can fail, or they can encounter operating difficulties and problems.

For example, small quantities of electrolyte may accumulate in the Bunsen Valve, when the battery is in an inverted position, or even if the battery is being transported in an inverted position, so that the small quantities of accumulated electrolyte may be expelled when the valve opens. Such circumstances can be damaging to any electronic components that are powered by the battery.

Also, and in any event, the physical presence of electrolyte between the rubber relief valve structure and the sealing surface against which it operates, in a typical Bunsen Valve, may prevent proper function in the future.

In the event of an alkaline electrolyte being present in the region of the pressure relief valve vent structure, that circumstance can be disastrous. Alkaline electrolyte tends to have a low surface tension, and therefore is much more likely to creep or enter the valve mechanism if the battery is in an inverted condition. Also, if there is exposure of the alkaline electrolyte to the atmosphere, then there will be a gradual build of carbonate as a consequence of the reaction of the residual alkaline electrolyte with carbon dioxide in the atmosphere.

Accordingly, particularly if the pressure relief valve is to be operated with alkaline cells, then the structure of the pressure relief valve must be such that no electrolyte may access the valve area under any conditions. To that end, the present invention provides a structure for a pressure relief valve which precludes access of electrolyte—whether it be alkaline or acidic—to the pressure relief valve under any conditions, and whether the battery is an inverted condition or an upright condition. This is accomplished by providing a structure that has a gas flow chamber having a height that extends below the top surface of the battery case structure to a sufficient distance that, if the battery is inverted, the end of the gas flow chamber and a dome that is affixed thereto, as described in greater detail thereafter, will stand above the liquid electrolyte.

Also, when the battery is in an upright orientation, the structure of the dome is such that any liquid electrolyte which attempts to accumulate on the dome will drop off the dome and back into the reservoir.

SUMMARY OF THE INVENTION

In accordance with one aspect of the present invention, there is provided a pressure relief valve structure for use with a secondary battery that is subjected to power cycling, where the secondary battery has a liquid electrolyte within the interior volume thereof.

The interior volume of the battery has a void space therein which overlies the liquid electrolyte within the battery, and the void space is subjected to negative and positive gas pressures with respect to the ambient pressure where the battery is located.

A known volume of liquid electrolyte is found within the interior of the battery and it is such that when the battery is inverted, the depth of the liquid electrolyte above the inverted top surface of the battery is a first known dimension.

The pressure relief valve structure of the present invention is installed in the top surface of the battery and extends above and below the top surface of the battery when the battery is in its upright orientation.

The pressure relief valve structure comprises a vertically oriented gas flow chamber, and an outer relief vent which is adapted to open only when gas pressure within the battery and the gas flow chamber exceeds a predetermined positive pressure with respect to the ambient pressure.

The gas flow chamber extends below the top surface of the battery for a distance which is greater than the first known dimension. A dome-like cap is fitted to the gas flow chamber at its bottom end, and it extends downwardly therefrom when the battery is in its upright orientation.

The dome-like cap has a plurality of openings therethrough so as to permit unimpeded gas flow between the interior volume of the battery and the gas flow chamber.

Also, the dome-like cap has a porous membrane cover thereover which permits gas flow therethrough between the interior volume of the battery and the gas flow chamber, but which is such as to preclude flow of liquid electrolyte therethrough from the interior volume of the battery to the gas flow chamber.

Typically, the shape of the dome-like cap is hemispherical, comical, pyramidal, or combinations thereof.

Also, typically the porous membrane of the cover over the dome-like cap is hydrophobic.

That material may be chosen from the group which consists of microporous polypropylene, microporous polythene, microporous PTFE, microporous FEP, other microporous fluoropolymers, and mixtures and co-polymers thereof.

The pressure relief valve structure may be such as to be removable from and reinstallable in the top surface of the battery.

The outer relief vent may comprise a stretchable cap which is placed over the upper end of the gas flow chamber, and an impervious plastic cap placed thereover.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
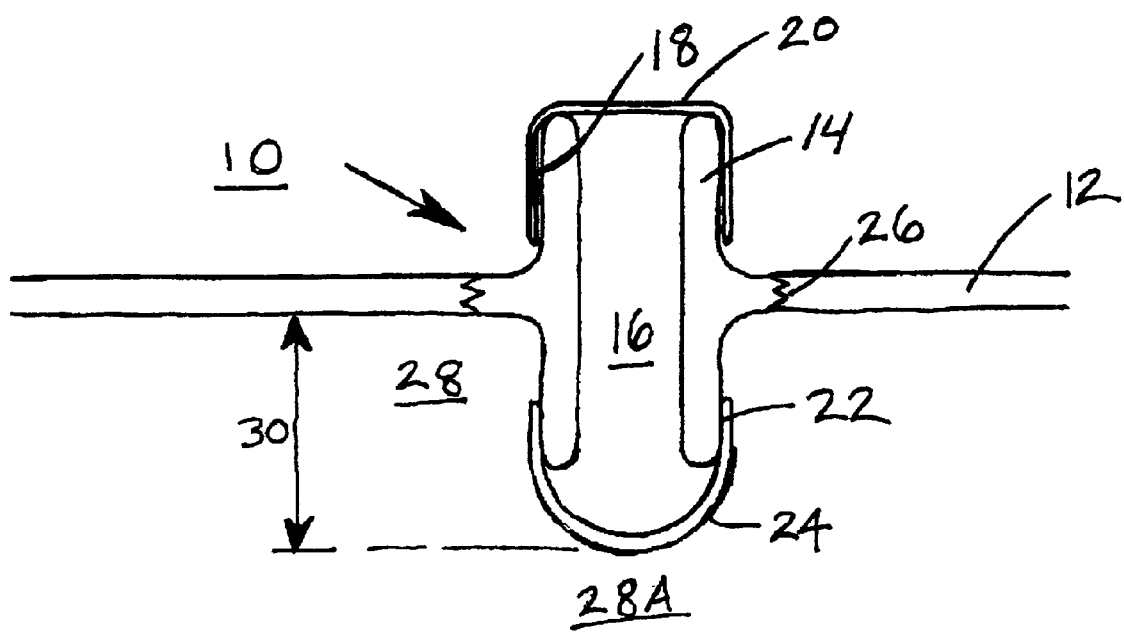
FIG. 1 is a schematic elevation of a pressure relief valve structure in keeping with the present invention, installed in the top surface of a battery.

The novel features which are believed to be characteristic of the present invention, as to its structure, organization, use and method of operation, together with further objectives and advantages thereof, will be better understood from the following discussion.

The pressure relief valve structure of the present invention is shown generally at 10 in FIG. 1. The structure comprises a wall structure 14—usually, cylindrical—which defines a gas flow chamber 16. The pressure relief valve structure 10 is installed in a top surface 12 of the a battery case, the remaining details of which are not important to the present discussion.

At the upper end of the gas flow chamber 16, an outer relief vent 18 is placed. The structure of the outer relief vent 18, and a protective impervious plastic cap 20 which is placed thereover, is effectively that of a typical Bunsen-type pressure relief vent or check valve structure.

At the bottom end of the gas flow chamber 16, which extends into void 28 within the interior volume of the battery, a dome-like cap 22 is placed over the walls 14 defining the gas flow chamber 16. The dome-like cap 22 is covered by a porous membrane 24.

The height of the end of the dome-like cap 22 above (below, in a literal sense with regard to FIG. 1) the top surface 12 of the battery, is shown at 30. The height is designed to be more than a first known dimension, described hereafter.

The pressure relief valve structure 10 maybe welded or moulded into the top surface 12 of the battery case, or it may be such as to be removable by threaded engagement, as indicated at 26. When the pressure relief valve structure 10 is removable such as by a threaded engagement 26, then it functions not only as a pressure relief valve structure but as a filling opening for placement of liquid electrolyte into the battery in the first instance, or for maintenance purposes.

Any battery or cell into which the pressure relief valve structure of the present invention is placed will have a known volume of liquid electrolyte placed within the interior of the battery. Thus, when the battery is inverted, the depth of the liquid electrolyte above the inverted top surface 12 of the battery will be a first known dimension. Dimension 30 is determined to be greater than that first known dimension, so that if the battery is placed in an inverted orientation, there will be gas access between the void 28A and the gas flow chamber 16.

Typically, however, batteries are operated in their upright orientation, although they may be carried in an inverted condition or orientation. When the battery is in its upright orientation, then the dome-like cap and its cover 24 are as shown in FIG. 1. It will be understood that any accumulation of electrolyte that may form on the dome-like cap and its membrane cover 24 will drop off the cap, as a consequence of its dome like-shape, and returned to the reservoir of liquid electrolyte within the battery.

The dome-like cap 22 is such as to have a plurality of openings therethrough so as to permit unimpeded gas flow through the cap 22 between the interior volume of the battery and the gas flow chamber 16.

Also, the porous membrane 24 which covers the dome-like cap 22 is such as to permit gas flow between the interior volume of the battery and the gas flow chamber 16, but is also such as to preclude flow of liquid electrolyte through the membrane covering 24 from the interior volume of the battery to the gas flow chamber 16. Thus, access by liquid electrolyte from the interior of the battery to the vent structure 18, 20, is precluded.

Typically, the shape of the dome-like cap 22 is hemispherical, but it may be conical or pyramidal, or combinations thereof, depending on the nature of the geometry of the gas flow chamber 16.

Also, typical so as to specifically preclude flow of electrolyte through the membrane covering 24, the porous membrane is hydrophobic.

The material of the porous membrane 24 may be microporous polypropylene, microporous polyethylene, microporous PTFE, microporous FEP other microporous fluoropolymers and mixtures and co-polymers thereof.

As indicated above, the pressure relief valve structure 10 may be removable and reinstallable in the top surface 12 of the battery, by virtue of such an arrangement as a threaded engagement 26.

To provide physical protection for the Bunsen-type pressure relief vent structure 18, an impervious plastic cap 20 may be placed thereover.

Typically the dome-like cap 22 is also plastic, which may be perforated or ribbed so as to provide a plurality of gas passages therethrough. The dome-like cap 22 may be thermally bonded to the walls 14 of the gas flow chamber 16, or it may be threaded onto the lower end of the walls 14 defining a gas flow chamber 16.

Because of the shape of the dome-like cap 22 and its membrane cover 24, any liquid electrolyte that is splashed onto the surface of the membrane covering 24 of the dome-like cap 22 will gather at the tip thereof and fall back into the liquid electrolyte reservoir within the interior volume of the battery, rather than blocking the surface of the dome-like cap 22 and its membrane covering 24.

Of course, hydrophobicity of the membrane covering 24 will assist in the repulsion of liquid electrolyte.

There has been described a pressure relief valve structure for use with secondary batteries which may be either lead acid or similar batteries, or alkaline batteries. The structure of the pressure relief valve is such that it is leak proof, and it is such that the dangerous accumulation of electrolyte near the vent structure is precluded. Thus, assurance that the vent will operate under all designed pressured conditions is given, and there will be no dangerous build up of carbonate near the vent structure because access of the liquid electrolyte thereto is precluded.

Other embodiments and modifications of pressure relief valve structures in keeping with the present invention may be made, without departing from spirit and scope of the appended claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A pressure relief valve structure for use with a secondary battery that is subjected to power cycling, and which has a liquid electrolyte within the interior volume thereof;

wherein the interior volume of the battery has a void space therein which overlies the liquid electrolyte within the battery, and said void space is subjected to negative and positive gas pressures with respect to the ambient pressure where the battery is located;

wherein a known volume of liquid electrolyte is within the interior of the battery such that, when the battery is inverted, the depth of the liquid electrolyte above the inverted top surface of the battery is a first known dimension; said pressure relief valve structure being installed in the top surface of the battery is in its upright orientation;

said pressure relief valve structure comprising a vertically oriented gas flow chamber, and an outer relief vent adapted to open only when gas pressure within the battery and said gas flow chamber exceeds a predetermined positive pressure with respect to the ambient pressure;

said gas flow chamber extending below the top surface of the battery for a distance greater than said first known dimension, and having a dome-like cap extending downwardly therefrom when said battery is in its upright orientation;

said dome-like cap having a plurality of openings therethrough so as to permit unimpeded gas flow between the interior volume of the battery and said gas flow chamber;

said dome-like cap having a porous membrane covering thereover so as to permit gas flow therethrough between the interior volume of the battery and said gas flow chamber, and so as to preclude flow of liquid electrolyte therethrough from the interior volume of the battery to said gas flow chamber.

2. The pressure relief valve structure of claim 1, wherein the shape of said dome-like cap is chosen from the group of shapes consisting of: hemispherical, conical, pyramidal, and combinations thereof.

3. The pressure relief valve structure of claim 2, wherein said porous membrane is hydrophobic.

4. The pressure relief valve structure of claim 3, wherein said porous membrane is selected from the group consisting of microporous polypropylene, microporous polyethylene, microporous PTFE, micro porous FEP, microporous fluoropolymers, and mixtures and co-polymers thereof.

5. The pressure relief valve structure of claim 3, wherein said pressure relief valve structure is removable from and reinstallable in said top surface of said battery.

6. The pressure relief valve structure of claim 3, wherein said outer relief vent comprises a stretchable cap placed over the upper end of said gas flow chamber, and an impervious plastic cap placed thereover.

7. The pressure relief valve structure of claim 1, wherein said secondary battery is an alkaline battery.

* * * * *